United States Patent Office 2,865,219
Patented Dec. 23, 1958

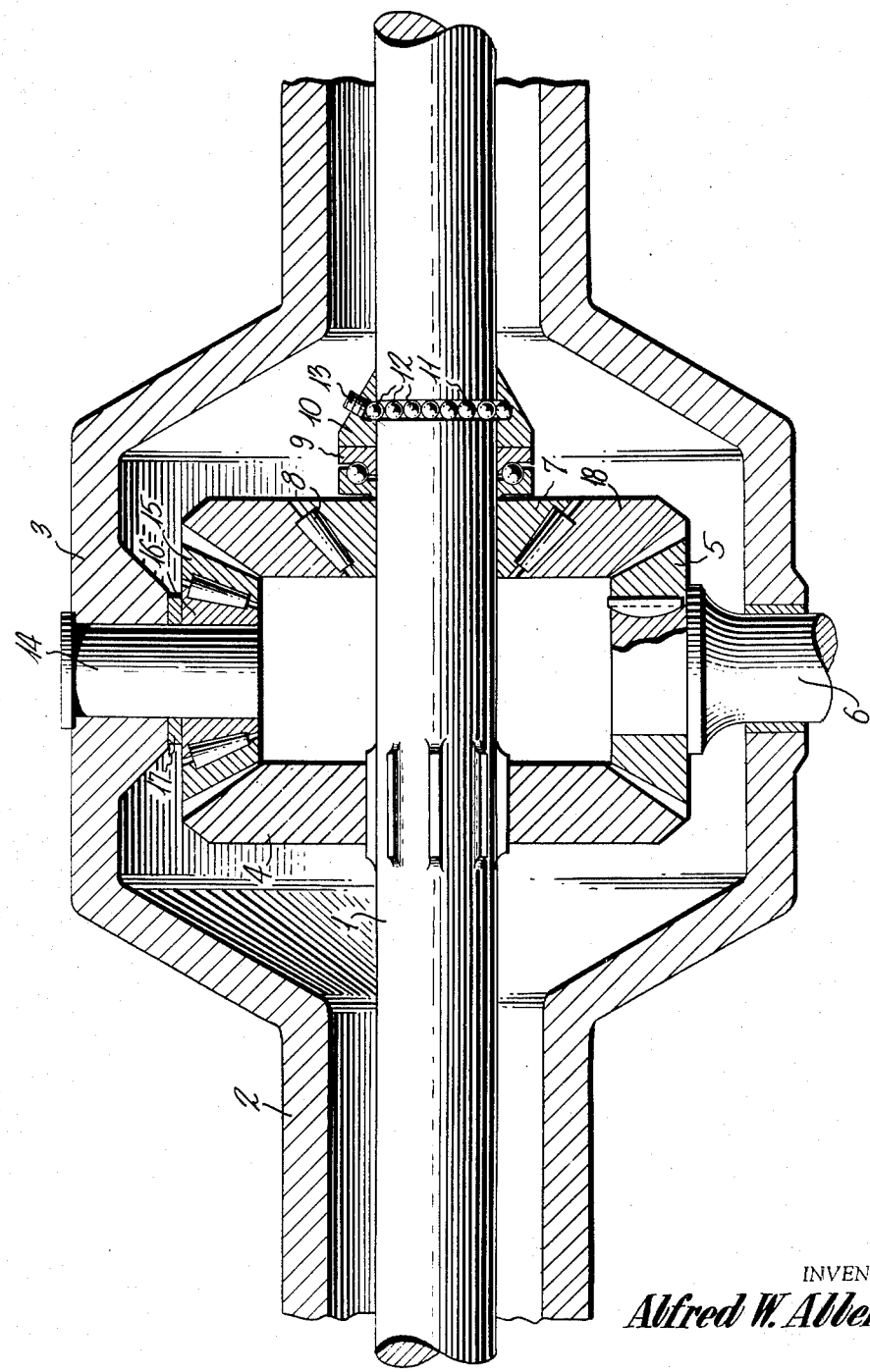

2,865,219

MEANS FOR TRANSMITTING POWER EQUALLY TO A DRIVEN SHAFT AT SYMMETRICALLY DISPLACED POINTS IN THE DIAMETRICAL PLANE OF SAID SHAFT

Alfred W. Allen, St. Petersburg, Fla.

Application January 4, 1957, Serial No. 632,451

2 Claims. (Cl. 74—410)

This invention relates to the class of machine elements and proposes a power transmission system by which power to turn a shaft or for any equivalent purpose is applied equally to the driven member at a plurality of circumferential points equally displaced in a diametrical plane of said driven member.

One of the objects of the invention is to provide a system of transmitting power to a shaft through gears, the power being applied at equal angularly displaced intervals to a gear fixed to said shaft, whereby the torque stress will be equally distributed, avoiding unbalanced strains on the shaft, and distributing the stress load equally upon two or more teeth of the fixed gear, this arrangement being particularly advantageous in uses which involve abrupt variations in, or suddenly applied loads upon said shaft.

Other objects of the invention will be come apparent as the following description of a practical embodiment thereof proceeds.

In the drawing which accompanies and forms a part of the following specification, the sole figure is a longitudinal sectional view of the middle portion of a shaft housing the transmission gears being shown in section.

Referring in detail to the drawing, the numeral 1 represents a driven shaft. A shaft housing 2 surrounds the shaft 1, the outer ends of the shaft being supported by bearings, not shown. The middle portion 3 of the housing 2 is enlarged and contains the transmission mechanism of the present invention. The shaft 1 extends through the housing undivided, being adapted to carry a load at either or both ends. A bevel gear 4 is suitably fixed to the shaft 1, and a driving gear 5 at the end of a drive shaft 6 meshes with the gear 4 and through it transmits power to the shaft. The invention proposes to divide this power by applying equal parts of it, in the present illustrative embodiment, to the gear 4 at opposite points.

In carrying out the invention, power is taken also from the opposite sides of the driving gear 5, which is in mesh with a gear 18, of the same diameter as the driven gear 4, which may be termed a "cross-over" gear, since it transmits the power to the opposite side of the axis of the shaft 1. The "cross-over" gear 18 is coaxial with the driven gear 4, and rotates upon a bevel race 7, through the intermediary of the conical rollers 8, the race being journalled upon the shaft 1 and kept from endwise movement in a direction away from the driven gear 4 by an end thrust bearing 9, which abuts a collar 10 second to the shaft. A number of common ways of securing the collar may be envisioned. By way of illustration, the shaft and collar are shown provided with matching channels 11, filled with ordinary bearing balls 12, inserted through a passage in the collar, the passage being closed by a screw plug 13. The balls intersect the plane of the interface between the shaft and collar.

A trunnion 14 is mounted in the housing 2 diametrically opposite to the drive shaft 6 and coaxial therewith. This affords support for the idler gear 15 which meshes at diametrically opposite points with the respective driven gear 4 and cross-over gear 18. As shown, the idler gear 15 is mounted upon an end thrust bearing construction including the conical race 16 which may be a free slip fit upon the trunnion 14 and abut a wear washer 17.

The operation of the above described gear set is extremely simple. The driving gear meshes with the driven gear at one point and with the cross-over gear at a diametrically opposite point. The cross-over gear being freely rotatable, reverses the direction of rotation of the idler gear 16 with relation to that of the driving gear, and since the driving gear and idler gear mesh with the driven gear at opposite points, the thrust transmitted by the idler gear to the driven gear is in the same circumferential direction as that transmitted by the driving gear. Thus, the power is equally applied to the driven gear and driven shaft at opposite points.

It will be understood by those skilled in the art that the number of points of power application to the driven gear is not limited to two, as shown. If for example, in place of the one idler gear 15, two similar idler gears were employed, each displaced 120° from the driving gear equal distribution of power would be accomplished, effective at three equally spaced points upon the driven gear and driven shaft, resulting in a still more even balance of the torque stresses and minimizing the hazard of tooth breakage under excessive impact stresses incident to sudden variations of load, by distributing the stresses over a greater number of teeth.

What I claim is:

1. Mechanism for transmitting power equally to diametrically opposite points of a driven shaft comprising, a housing, a drive shaft extending into said housing through one side thereof supported by a bearing in said side, a driven shaft extending through said housing positioned with its axis perpendicularly intersecting the produced axis of said drive shaft, an idler gear mounted in said housing at the side of said driven shaft opposite said drive shaft, coaxially with said drive shaft, a drive gear fast to said drive shaft, and fast and loose gears on said driven shaft respectively in mesh with said drive gear and idler gear at diametrically opposite points of said gears.

2. Mechanism for transmitting power equally to diametrically opposite points of a driven shaft in a shaft relationship in which the drive shaft terminates adjacent an intermediate point of the driven shaft perpendicularly thereto and in the same plane, said mechanism comprising a cross-over gear freely mounted to rotate on said driven shaft, a gear fixed to said driven shaft, a drive gear fixed to said drive shaft and an idler gear coaxial therewith at the opposite side of said driven shaft, said drive gear and said idler gear being in mesh with both said cross-over gear and said fixed driven shaft gear.

References Cited in the file of this patent

UNITED STATES PATENTS

| | | |
|---|---|---|
| 1,351,470 | Davis | Aug. 31, 1920 |
| 1,738,695 | Dennison | Dec. 10, 1929 |
| 1,856,443 | Steockicht | May 3, 1932 |
| 1,984,958 | Barske | Dec. 18, 1934 |